March 16, 1954     P. P. NEWCOMB     2,672,010
PRESSURIZED LUBRICATION SYSTEM FOR GAS TURBINES
Filed July 14, 1951
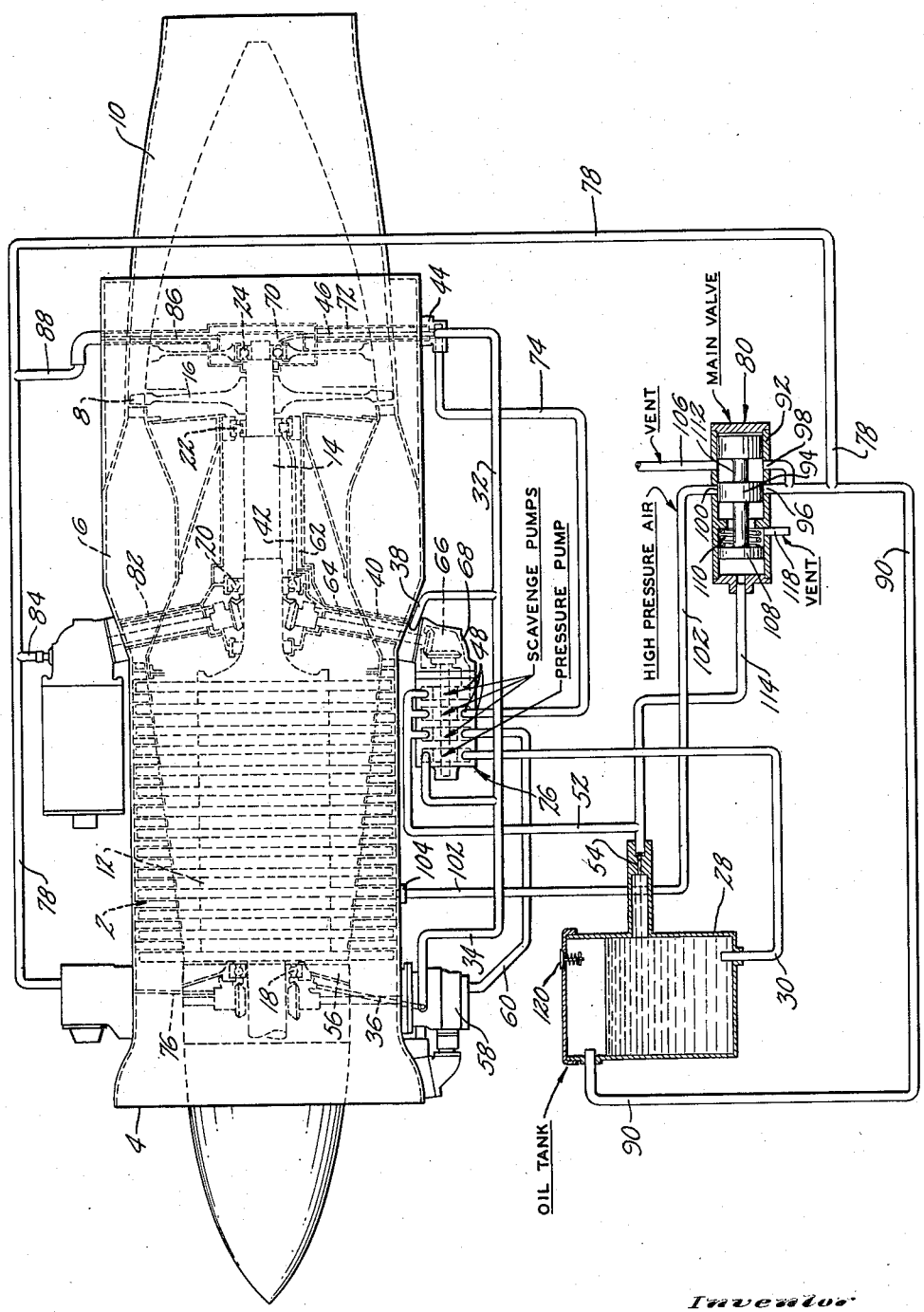

Patented Mar. 16, 1954

2,672,010

UNITED STATES PATENT OFFICE 2,672,010

PRESSURIZED LUBRICATION SYSTEM
FOR GAS TURBINES

Philip P. Newcomb, Manchester, Conn., assignor to United Aircraft Corporation, East Hartford, Conn., a corporation of Delaware Application July 14, 1951, Serial No. 236,760

8 Claims. (Cl. 60—39.08)

The present invention relates to lubrication systems for gas turbine power plants and particularly to an arrangement for pressurizing the system if the pressures within the system become such that the scavenge pumps do not function.

It is well-known that there is a minimum pressure below which pumps will not function since the pressure head would then not be adequate to force the fluid being pumped into the pump chambers. Although most pumps will work at sea level atmospheric pressure the same pumps may not function at high altitudes since the existing ambient pressure would be less than the required minimum pressure to operate the pump. When this event occurs the pumps will not deliver any fluid and will not maintain a delivery pressure. If the pumps are used for lubricating the bearings of a power plant or for scavenging the oil from the bearing sumps, the failure of the pumps to operate will result in an inadequate supply of lubrication. A feature of this invention is an arrangement for maintaining a pressure on the lubrication system whenever the delivery pressure of the scavenge pumps drops as a result of failure of the lubricant to reach the pumps.

Another feature of the invention is a valve which is actuated by the delivery pressure from one or more of the scavenge pumps in a power plant and so arranged as to supply air under pressure to the lubricant system whenever the delivery pressure of the pump drops below a predetermined value.

This invention is in many respects a modification of the invention described and claimed in the copending Newcomb application Serial No. 236,759 filed July 14, 1951, in which the pressurizing of the system is directly responsive to ambient pressure.

Other objects and advantages will be apparent from the specification and claims, and from the accompanying drawing which illustrates an embodiment of the invention.

The single figure is a diagrammatic view of the lubricant system as applied to a gas turbine power plant, shown schematically.

The gas turbine power plant includes a compressor 2 having an air inlet 4 at its upstream end and at its delivery end discharging air into the combustor or combustors 6. Fuel is supplied to these combustors by a suitable arrangement of nozzles, not shown, and this fuel is burned with the air in the combustors. The resulting products of combustion are discharged through a turbine 8 and thence through a thrust nozzle 10. The compressor includes a rotor 12 connected as by a shaft 14 to the turbine rotor 16. The rotor assembly is carried by spaced bearings 18 and 20 located at opposite ends of the compressor and other bearings 22 and 24 located on opposite sides of the turbine rotor. It will be understood that the power plant and the location of the bearings is diagrammatically shown and the bearings may be otherwise arranged depending upon the type of power plant.

Lubrication for the bearings is provided by a pressure pump 26 which pumps lubricant from the tank 28 through a conduit 30 and thence through a delivery conduit 32 to the several bearings. In the arrangement shown a branch conduit 34 communicating with the conduit 32 supplies lubricant to a substantially radial passage 36 located in the compressor structure adjacent to the bearing 18. Lubricant flowing through passage 36 is discharged onto the bearing. Another branch conduit 38 extending from conduit 32 delivers fuel to a passage 40 located in the power plant structure adjacent to the bearing 20 and supplying lubricant to both bearings 20 and 22. A branch passage 42 which approximately parallels the shaft 14 supplies the bearings 22. The delivery conduit 32 extends to a bracket 44 on the power plant structure adjacent to the turbine and from this bracket lubricant flows through a substantially radial passage 46 to be discharged against bearing 24.

Oil sumps are located adjacent each of the bearings and a series of scavenge pumps 48 function to remove the oil from the several sumps and return it through a return conduit 52 to the tank 28. The conduit 52 has a restriction 54 therein for a purpose which will appear later.

A sump 56 is located adjacent the bearing 18 and oil from this sump is returned through passages (not shown) in a bracket 58 and through a return conduit 60 to one of the scavenge pumps 48. Another sump 62 collects lubricant from bearings 20 and 22. From this sump lubricant flows through a radial passage 64 parallel to the supply passage 40 and through a chamber 66 in the end of the housing 68 in which the scavenge pumps are located into one of the scavenge pumps. A sump 70 encloses bearing 24 and from this sump lubricant is returned through a passage 72 and a conduit 74 to one of the scavenge pumps.

The several sumps and the tank 28 are all vented to atmosphere. Sump 56 is vented through a radial passage 76 to a breather conduit 78 which communicates with a control valve 80. Sump 62 is vented to a radial passage 82 and a branch conduit 84 into the conduit 78. Sump 70 is vented through a radial passage 86 and a branch conduit 88 to the conduit 78. The tank 28 is vented through a branch conduit 90 communicating with the conduit 78.

The control valve 80 includes a casing 92 having a plunger valve 94 slidable therein. The casing has spaced ports 96 and 98 communicating with the conduit 78. Radially aligned with the port 96 is a pressure port 100 connected as by a conduit 102 to a pressure top 104 in the compressor thereby supplying air under pressure to port 100. In radial alignment with the port 98 is another port 106 which vents to atmosphere.

The valve 94 carries at one end a piston 108 which is normally urged by spring 110 in a direction to cut off the fluid connection between the ports 98 and 106 and to open the connection between ports 96 and 100 by means of the groove 112 in the plunger valve. In opposition to the action of the spring 110 the other side of the piston 108 is subjected to pressure from the discharge side of any one or all of the scavenge pumps as by means of a branch conduit 114 extending from the return conduit 52 to the end of the valve casing 92. The side of the piston 108 opposite to the pressure supply may be vented through a vent port 118. In operation the power plant is started with the plunger 94 moved to the left from the position shown thereby closing off the vent port 106. As soon as the power plant begins to operate, however, pressure developed in the return conduit 52 and maintained by the restriction 54 moves the plunger 94 into the position shown so that during normal operation of the power plant the oil collecting chambers and the tank 28 will be vented to the atmosphere through the conduit 78 and through the groove 112 in the valve to the vent port 106. If at any time the scavenge pump or pumps fail to pump this return oil by reason of a reduced atmospheric pressure, the pressure in the conduit 52 will drop thereby dropping the pressure acting on the piston 108 so that the spring 110 will shift the valve to the left admitting high pressure air from the compressor into the conduit 78 for effectively pressurizing the lubricant system. To prevent the development of abnormally high pressures in the tank 28, a vent valve 120 may be provided in the tank so arranged as to open outwardly, exhausting air if necessary.

It is to be understood that the invention is not limited to the specific embodiment herein illustrated and described, but may be used in other ways without departure from its spirit as defined by the following claims.

I claim:

1. An engine lubrication system including a supply tank, a pressure pump for supplying air under pressure to said engine, a sump from which oil from the engine is collected and a scavenge pump for returning oil from the sump to the tank, in combination with a supply of air pressure, a connection from said supply to said sump, a valve in said connection, and pressure responsive means connected to and actuated by the pressure at the discharge side of the scavenge pump for moving said valve.

2. An engine lubrication system including a supply tank, a pressure pump for supplying air under pressure to said engine, a sump from which oil from the engine is collected and a scavenge pump for returning oil from the sump to the tank, in combination with a supply of air under pressure, a connection from said supply to said sump, a valve in said connection, pressure responsive means connected to and actuated by the pressure at the discharge side of the scavenge pump for moving said valve, and a spring opposing the pressure acting on said pressure responsive means and acting on said valve to move said valve into open position when the pressure at the discharge side of the scavenge pump reaches a predetermined minimum.

3. An engine lubrication system including a supply tank, a pressure pump for supplying air under pressure to said engine, a sump from which oil from the engine is collected and a scavenge pump for returning oil from the sump to the tank, in combination with a supply of air under pressure, a connection from said supply to said sump, a valve in said connection, and pressure responsive means connected to and actuated by the pressure at the discharge side of the scavenge pump for moving said valve into open position when the pressure at the discharge side of the scavenge pump reaches a predetermined minimum, and an orifice between the tank and the scavenge pump downstream of the connection to the pressure responsive means.

4. An engine lubrication system including a supply tank, a pressure pump for supplying air under pressure to said engine, a sump from which oil from the engine is collected and a scavenge pump for returning oil from the sump to the tank, and a vent for the system in combination with a supply of air under pressure, a connection from said supply to the sump, a valve in said connection in a position to connect said sump selectively to the supply of air under pressure or to said vent, and pressure responsive means connected to the delivery side of the scavenge pump for actuating said valve.

5. An engine lubrication system including a supply tank, a pressure pump for supplying air under pressure to said engine, a sump from which oil from the engine is collected and a scavenge pump for returning oil from the sump to the tank, and a vent for the system in combination with a supply of air under pressure, a connection from said supply to the sump, a valve in said connection in a position to connect said sump selectively to the supply of air under pressure or to said vent, and pressure responsive means connected to the delivery side of the scavenge pump for shifting said valve into a position to connect the supply of air under pressure to said sump when the pressure at the delivery side of the scavenge pump reaches a selected minimum.

6. A turbine having a rotor, a bearing for the rotor, a housing for the bearing having a scavenge chamber to collect oil from the bearing, and a scavenge pump for pumping oil from said chamber, in combination with means for maintaining a pressure in said chamber, said means including a source of gas under pressure having a connection to said chamber, a valve in said connection, pressure responsive means for moving said valve, and a connection from said pressure responsive means to the scavenge pump for actuation of said means by the delivery pressure of the pump.

7. A turbine including a rotor, spaced bearings for the rotor, housings in which said bearings are mounted, said housings having chambers to collect oil from the bearings, at least one scavenge pump for removing oil from the chambers, and means for maintaining a predetermined pressure in said chambers including a source of gas under pressure having a connection to said chambers, a vent for said chambers having a connection to said chambers, and pressure actuated valve means in said connections, and a connection from said pressure actuated means to the scavenge pump such that said means are responsive to scavenge pump pressure, said pressure actuated means moving said valve in response to scavenge pump pressure to a position for admitting gas under pressure to the chambers and for closing off the vent when the delivery pressure of the scavenge pump reaches a predetermined minimum.

8. A gas turbine power plant including a compressor and turbine each having a rotor, bearings for said rotors, at least one of said bearings having a supporting housing with a chamber to collect oil from the bearings, pumps for supplying oil to the bearings and for scavenging oil from the chamber, a connection from said compressor to said chamber for supplying air under pressure from said compressor to said chamber, a pressure actuated valve in said connection, and a connection from the scavenge pump to said valve for holding said valve closed above a predetermined minimum delivery pressure from the scavenge pump.

PHILIP P. NEWCOMB.

No references cited.